L. M. COOPER.
STEERING WHEEL.
APPLICATION FILED MAR. 24, 1917.
1,255,136.
Patented Feb. 5, 1918.
2 SHEETS—SHEET 1.
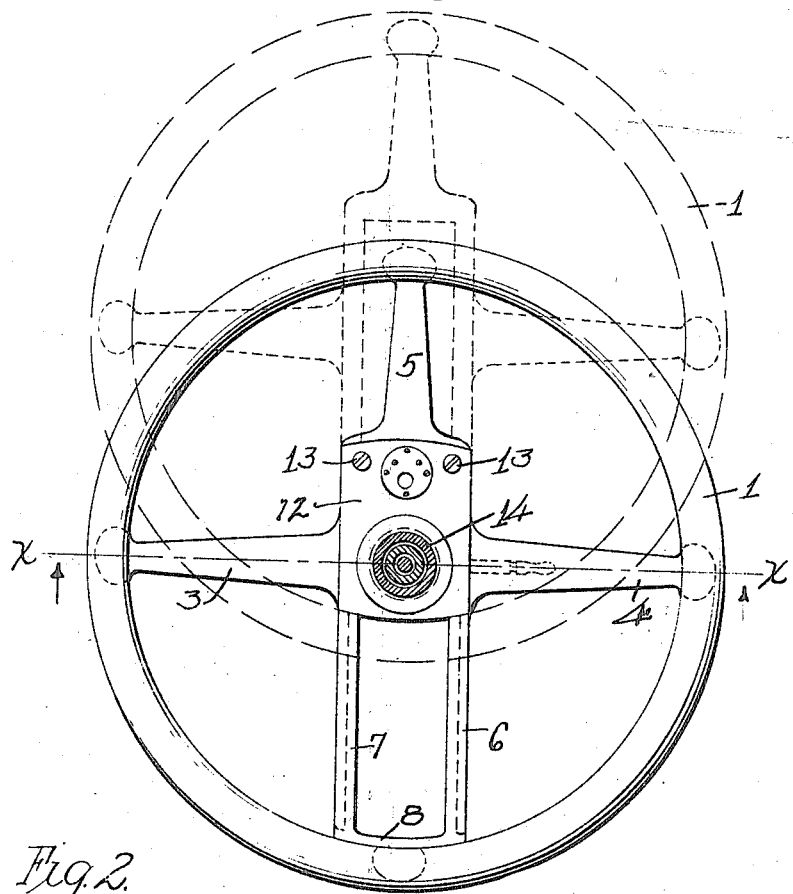
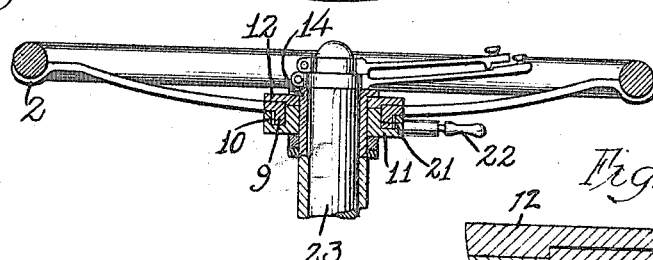
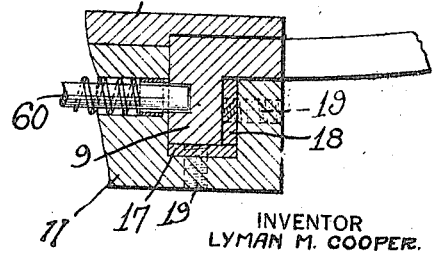
INVENTOR
LYMAN M. COOPER.
BY
ATTORNEY L. M. COOPER.
STEERING WHEEL.
APPLICATION FILED MAR. 24, 1917.
1,255,136.
Patented Feb. 5, 1918.
2 SHEETS—SHEET 2.
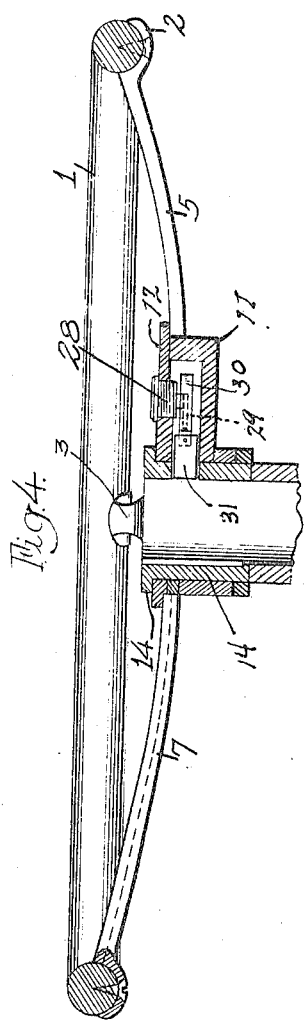
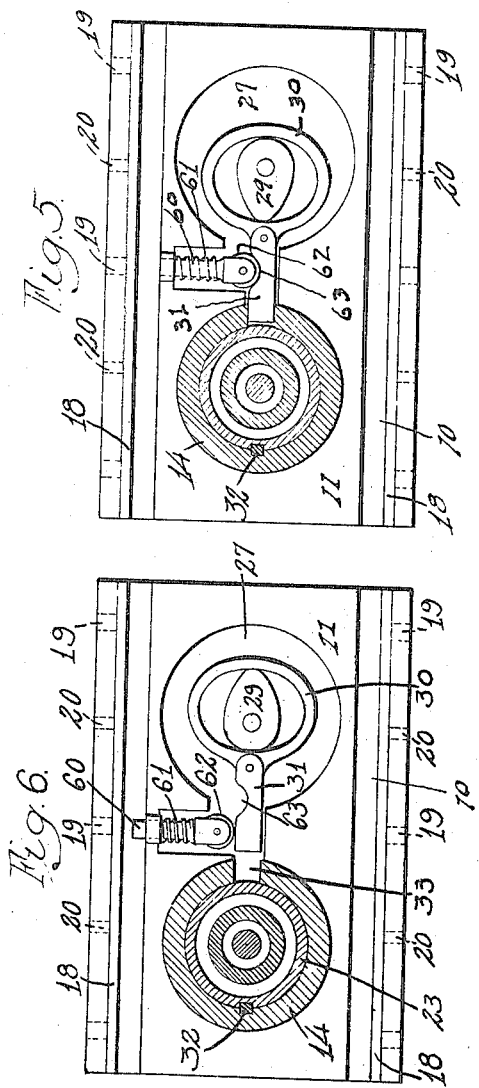
INVENTOR
LYMAN M. COOPER
BY
ATTORNEY

UNITED STATES PATENT OFFICE.

LYMAN M. COOPER, OF DETROIT, MICHIGAN, ASSIGNOR OF ONE-HALF TO THOMAS J. CLINTON, OF DETROIT, MICHIGAN.

STEERING-WHEEL.

1,255,136.  Specification of Letters Patent.  Patented Feb. 5, 1918.

Application filed March 24, 1917. Serial No. 157,090.

*To all whom it may concern:*

Be it known that I, LYMAN M. COOPER, a citizen of the United States, residing at Detroit, county of Wayne, State of Michigan, have invented a certain new and useful Improvement in Steering-Wheels, and declare the following to be a full, clear, and exact description of the same, such as will enable others skilled in the art to which it pertains to make and use the same, reference being had to the accompanying drawings, which form a part of this specification.

This invention relates to steering wheels for automobiles, it being mainly a device of my pending application, Serial No. 60,173, filed November 8, 1915, with some additions not described in said former application. An object of the invention is a steering wheel adapted to slide relative to the steering shaft and locked to turn with the shaft when in the usual position, or to release it htererom to allow the wheel to turn independently of the shaft, as was described in said former application. An additional provision of the lock in this present application exists in providing a lock for the sliding part of the wheel so that the wheel may be moved outward to inoperative position and locked in such position by the key and lock utilized in unlocking the wheel from the shaft thereby preventing use of the car by un.. ithorized persons. The particular object of the invention is a wheel involving the locking and sliding feature in a single structure in the preferable form of construction. These and other objects and the several novel features of the invention in its preferred form are hereinafter more fully described and claimed and shown in the accompanying drawing in which—

Figure 1 is a plan view of a steering wheel embodying my invention.

Fig. 2 is a cross section thereof taken on line *x—x* of Fig. 1.

Fig. 3 is an enlarged detail showing the flanged spider of the wheel in slidable relation with the head and the lock for securing the wheel from sliding.

Fig. 4 is a longitudinal section of the wheel showing the lock.

Fig. 5 is an enlarged plan view showing the locking device in locked position.

Fig. 6 is a similar view showing the locking device in unlocked position in which the steering wheel is movable with the steering shaft.

As is shown in Fig. 1 the wheel rim 1 which is preferably of wood is secured to the ends of the spider, the said ends being formed to receive the lower side of the rim as indicated at 2 in Fig. 2. The spider consists of the two opposite arms 3 and 4 and a single arm 5 opposite to which is a slotted arm having two side members 6 and 7 united by a cross bar 8 at the extreme end of the structure and secured to the rim in a manner similar to the arms 3 and 4, the members 6 and 7 having a depending flanged portion 9 shown more particularly in Figs. 2 and 3 which ride in parallel grooves 10 formed in each side of the head 11. These flanges are held in place by a cover plate 12 secured by the screws 13 and a bushing 14 after the manner described in the said former pending application. The portions 6 and 7 of the slotted arm and flanges thereon ride comparatively freely in the grooves in the head 11 and gibs 17 and 18 are provided in each groove to take up wear, the said gibs being held in place by several screws 19 locked in threaded apertures in the head, as will be understood from Fig. 3 whereby the gibs may be set up. The gibs are also provided with one or more pins 20 engaging in apertures in the head to prevent the movement of the gib endwise in the slot by movement of the flanges 9 therein. As indicated at 21 in Fig. 2, one of the flanges 9 is apertured to receive the end of a spring pressed plunger 22 carried in a boss on the head which holds the spider in its set position relative to the central steering shaft 23, there being two such apertures in one of which the pin engages when the wheel is centrally positioned relative to the shaft as indicated by full lines in Fig. 1, and the other of which when out of such position as indicated by dotted lines in the said Fig. 1. The wheel is thus normally detachably secured in either operative or inoperative position and when in the inoperative position as shown by dotted lines the said wheel may not be turned completely about to efficiently steer the machine as there is not room for revolution of the wheel when in such eccentric position relative to the shaft, and when in such eccentric position the driver may readily enter the vehicle beneath the wheel and move the wheel back to position indicated by full lines for steering purposes.

The head 11 in which the grooves 10 are provided is formed with a recess 27 into which the barrel of a lock 28 extends. The flange of the barrel is secured to the cover plate in any desired manner and at the lower end of the barrel is a cam shaped member 29 indicated more particularly in Figs. 5 and 6 which engages within a ring shaped member 30 which is pivotally secured to a bolt 31. The bolt rides in a slot provided between the recess 27 and the aperture in the head in which the bushing 14 is secured. As indicated in Figs. 5 and 6, the bushing is secured to the steering shaft 23 by a key 32 so that the bushing and shaft may move as a unit. The bushing 14, as is indicated in Figs. 5 and 6 is provided with an aperture 33 adapted to be engaged by the bolt 31 when moved by the lock as is shown in Fig. 5, and when the bolt is withdrawn from the slot the head 11 may turn freely on the bushing 14 thus locking the car against use thereof. Thus it can be seen that when the bolt 30 is withdrawn from the notch 33 the steering wheel is no longer effective to rotate the steering shaft, and by turning the lock so that the bolt again engages the slot in the bushing the head is secured in fixed relation with the steering shaft and rotation of the wheel will then turn the shaft as is desired. By pivotally connecting the ring 30 with bolt, the cam member 29 on the end of the lock barrel does not tend to bind the bolt 31 in the slot in which it rides, as the ring is free to move from side to side during rotation of the cam member to effect the movement of the bolt.

A further lock arrangement is provided by the bolt 60 extending at a right angle to the bolt 31 and positioned in a recess in the head 11. This bolt extends outward through an aperture at the end of the recess and into a groove 10 on one side of the head, as will be understood from Fig. 6, and a spring 61 is provided normally tending to retract the bolt from the groove. The opposite end of the bolt is provided with a roller 62 riding on the bolt 31 and the bolt 31 is notched at 63 to receive the roller when positioned in alinement therewith. By arrangement of the parts here shown the bolt 31 when withdrawn from engagement with the notch 33 of the bushing 14 forces the bolt 60 into the groove 10 and the flange 9 on that side of the steering head is apertured to receive the said bolt, as will be understood from Fig. 3. This aperture is provided in the flange 9 to register in alinement with the bolt 60 when the wheel has been moved in the grooves to position shown by dotted lines in Fig. 1. At this time when both bolts are in position shown in Fig. 6 the wheel is free to turn on the steering shaft and the wheel is locked in inoperative position, and it is to be understood as being within the spirit of this invention to key the bushing 14 to the head 11 so that at all times the head and shaft must move together in which case the bolt 31 should be shortened so as not to require the recess 33 therefor in the bushing but nevertheless of sufficient length to operate the bolt 60 so that the wheel may be in locked position when moved as is shown by dotted lines in Fig. 1, which position is considered undesirable for steering purposes, it not being possible with the driver in position on the seat to turn the wheel to such extent as to enable one to steer the car but nevertheless does allow some movement whereby a car may be towed by another without entire loss of control of the guiding wheels of the vehicle.

From the foregoing description it becomes evident that the same is of simple construction and that in ordinary use by release of the spring pressed plunger 22 the wheel may be moved freely relative to the cylindrical shaft and furthermore by use of the lock or arrangement described, the wheel may be locked or unlocked relative to the steering shaft and may be locked in position relative to the head as may be desired. The lock controlling the cam member 29 may be of any approved type by means of which the bolt may be operated but is preferably of the barrel type here shown and the bolt preferably engaging the flange of the wheel spider is operated in conjunction with the bolt directly controlled by the cam member.

Having thus briefly described my invention, its utility and mode of operation, what I claim and desire to secure by Letters Patent of the United States is—

1. The combination with a shaft, of a head thereon adapted for rotation relative thereto, a steering wheel carried by the head and adapted to slide in a plane substantially at a right angle to the shaft, and releasable means carried by the head adapted to secure the head to rotate with the shaft and release the wheel to sliding movement or secure the wheel to the head and release the head to rotation relative to the shaft.

2. The combination with a shaft and steering wheel, of a head on the shaft, the wheel being carried by the head and adapted to slide in a plane substantially at a right angle to the shaft and a locking device carried by the head adapted to secure the head in rigid relation with the shaft or free it to turn relative thereto and to simultaneously lock the wheel in eccentric relation to the shaft when freed from rotation therewith.

3. The combination with a shaft, of a head, a cylindrical member carried by the head about which it may freely turn, said member being keyed to the shaft, locking means for locking the head to move with the cylindrical member or to release it therefrom, and a hand wheel carried by the head relatively slidable in a plane substantially at a right angle to the shaft, said locking means being adapted to lock the wheel to the head when moved to eccentric relation to the shaft.

4. The combination with a shaft, of a head, a steering wheel carried thereby, a cylindrical member secured in an aperture in the head and keyed to the shaft, the head being adapted to turn freely on the cylindrical member, locking means for securing the head to the cylindrical member, the head having parallel grooves on opposite sides of the shaft and the wheel having a spider with corresponding flanges adapted to ride in the grooves, means for securing the flanges in the grooves, and a lock coöperative with the first named lock for locking the wheel relative to the head.

5. The combination with a shaft and steering wheel, of a head on the shaft, the wheel being carried by the head and adapted to slide in a plane substantially at a right angle thereto, and a key operated locking device adapted to lock the wheel to the head when moved to eccentric relation with the shaft.

6. The combination with a shaft, of a steering head thereon adapted to be secured to or released from operation jointly with the shaft, a steering wheel adapted to slide relative to the head in a plane substantially at a right angle to the shaft, and a key operated locking device whereby the head may be secured to or released from the shaft said lock operating to simultaneously lock the steering wheel when moved out of normal position relative to the head and free to turn about the shaft, and to release the wheel to slidable relation with the head when the head is locked to turn with the shaft.

In testimony whereof, I sign this specification.

LYMAN M. COOPER.